US008898073B2

United States Patent
Dharmaji

(10) Patent No.: US 8,898,073 B2
(45) Date of Patent: Nov. 25, 2014

(54) ADVERTISEMENT INSERTION DURING APPLICATION LAUNCH IN HANDHELD, MOBILE DISPLAY DEVICES

(75) Inventor: Srinivasa Dharmaji, Cupertino, CA (US)

(73) Assignee: Goldspot Media, Inc., Santa Clara, CA (US)

(*) Notice: Subject to any disclaimer, the term of this patent is extended or adjusted under 35 U.S.C. 154(b) by 228 days.

(21) Appl. No.: 12/494,097

(22) Filed: Jun. 29, 2009

(65) Prior Publication Data

US 2009/0319375 A1   Dec. 24, 2009

Related U.S. Application Data

(63) Continuation-in-part of application No. 11/828,204, filed on Jul. 25, 2007.

(60) Provisional application No. 60/834,039, filed on Jul. 29, 2006.

(51) Int. Cl.
| | | |
|---|---|---|
| *G06Q 30/00* | (2012.01) | |
| *G06F 9/445* | (2006.01) | |
| *H04N 21/81* | (2011.01) | |
| *G06F 15/02* | (2006.01) | |
| *G06Q 30/02* | (2012.01) | |

(52) U.S. Cl.
CPC ............. *H04N 21/812* (2013.01); *G06Q 30/00* (2013.01); *G06F 15/025* (2013.01); *G06Q 30/02* (2013.01); *G06Q 30/0267* (2013.01)
USPC ........................................ 705/14.64; 717/178

(58) Field of Classification Search
USPC ............. 709/217, 246, 250; 705/14.4, 14.64, 705/14.69, 50–54; 348/E5.006, E5.008, 348/E7.06, E7.009, E7.07; 717/178
See application file for complete search history.

(56) References Cited

U.S. PATENT DOCUMENTS

| | | | |
|---|---|---|---|
| 5,155,591 | A | 10/1992 | Wachob |
| 5,319,455 | A | 6/1994 | Hoarty et al. |
| 5,874,986 | A | 2/1999 | Gibbon et al. |
| 5,907,321 | A | 5/1999 | Grossman et al. |
| 6,006,257 | A | 12/1999 | Slezak |
| 6,446,261 | B1 | 9/2002 | Rosser |

(Continued)

OTHER PUBLICATIONS

The Int'l Search Report and Written Opinion, mailed Aug. 12, 2008, for related PCT patent application PCT/US07/74472, 12 pages.

(Continued)

*Primary Examiner* — Sun Li
(74) *Attorney, Agent, or Firm* — Michael A. Glenn; Perkins Coie LLP

(57) ABSTRACT

A time delay that occurs when an application is launched in a mobile handheld display device (MHDD), when the application or content is downloaded, before the MHDD is ready for the user to interact with it, wastes the user's time and, in an embodiment of the invention, this time delay constitutes an interval that is used to display targeted advertisements that are already stored on the MHDD, and that are rendered and displayed to the user on the screen while the user waits for completion of downloading of the application or content to the MHDD. An embodiment of the invention provides a micro-splicer that inserts alternate content for display on an MHDD, and renders and displays pre-stored advertisements during application launch time.

3 Claims, 3 Drawing Sheets

(56) References Cited

U.S. PATENT DOCUMENTS

| | | |
|---|---|---|
| 6,698,020 B1 * | 2/2004 | Zigmond et al. ............ 725/34 |
| 6,820,277 B1 | 11/2004 | Eldering et al. |
| 6,834,195 B2 | 12/2004 | Brandenberg et al. |
| 6,880,123 B1 | 4/2005 | Landsman et al. |
| 6,977,667 B1 | 12/2005 | Burke |
| 6,990,630 B2 | 1/2006 | Landsman et al. |
| 7,028,327 B1 | 4/2006 | Dougherty et al. |
| 7,068,719 B2 | 6/2006 | Liu et al. |
| 7,093,277 B2 | 8/2006 | Perlman |
| 7,103,904 B1 | 9/2006 | Blackketter et al. |
| 7,149,958 B2 | 12/2006 | Landsman et al. |
| 7,152,237 B2 | 12/2006 | Flickinger et al. |
| 7,155,663 B2 | 12/2006 | Landsman et al. |
| 7,185,353 B2 | 2/2007 | Schlack |
| 7,228,555 B2 | 6/2007 | Schlack |
| 7,376,414 B2 | 5/2008 | Engstrom |
| 7,720,432 B1 | 5/2010 | Colby et al. |
| 2001/0025378 A1 | 9/2001 | Sakamoto et al. |
| 2002/0092019 A1 | 7/2002 | Marcus |
| 2002/0103919 A1 | 8/2002 | Hannaway |
| 2002/0144263 A1 | 10/2002 | Eldering et al. |
| 2002/0194592 A1 | 12/2002 | Tsuchida et al. |
| 2003/0033157 A1 | 2/2003 | Dempski et al. |
| 2003/0149975 A1 | 8/2003 | Eldering et al. |
| 2003/0163810 A1 | 8/2003 | Iijima et al. |
| 2004/0003398 A1 | 1/2004 | Donian et al. |
| 2004/0015608 A1 | 1/2004 | Ellis et al. |
| 2004/0025174 A1 | 2/2004 | Cerrato |
| 2004/0111465 A1 | 6/2004 | Chuang et al. |
| 2004/0123097 A1 | 6/2004 | Ranjan |
| 2004/0158865 A1 | 8/2004 | Kubler et al. |
| 2004/0171399 A1 | 9/2004 | Uchida et al. |
| 2004/0194131 A1 | 9/2004 | Ellis et al. |
| 2005/0058149 A1 | 11/2004 | Konig et al. |
| 2004/0244035 A1 | 12/2004 | Wright et al. |
| 2005/0050577 A1 | 3/2005 | Westbrook |
| 2005/0097624 A1 | 5/2005 | Salo et al. |
| 2005/0107109 A1 | 5/2005 | Gunaratnam et al. |
| 2005/0245241 A1 | 11/2005 | Durand et al. |
| 2006/0100928 A1 * | 5/2006 | Walczak et al. ............ 705/14 |
| 2006/0130119 A1 | 6/2006 | Candelore et al. |
| 2006/0130121 A1 | 6/2006 | Candelore et al. |
| 2006/0168616 A1 | 7/2006 | Candelore |
| 2007/0055985 A1 | 3/2007 | Schiller et al. |
| 2007/0061203 A1 | 3/2007 | Ellis et al. |
| 2007/0061204 A1 | 3/2007 | Ellis et al. |
| 2007/0079325 A1 | 4/2007 | de Heer |
| 2007/0113243 A1 | 5/2007 | Brey |
| 2007/0157231 A1 | 7/2007 | Eldering et al. |
| 2008/0040743 A1 | 2/2008 | Dharmaji |
| 2008/0192736 A1 | 8/2008 | Jabri et al. |
| 2008/0195664 A1 | 8/2008 | Maharajh et al. |
| 2008/0201225 A1 | 8/2008 | Maharajh et al. |
| 2008/0207137 A1 | 8/2008 | Maharajh et al. |
| 2009/0076904 A1 | 3/2009 | Serena |
| 2009/0204487 A1 | 8/2009 | Cansler et al. |
| 2009/0319375 A1 | 12/2009 | Dharmaji |

OTHER PUBLICATIONS

The Int'l Preliminary Report on Patentability mailed Feb. 12, 2009 for related PCT patent application No. PCT/US07/74472, 9 pages.
The Int'l Preliminary Report on Patentability mailed Mar. 5, 2009 for related PCT patent application No. PCT/US07/76537, 6 pages.
The Int'l Search Report and Written Opinion, mailed Jul. 28, 2008, for related PCT patent application No. PCT/US07/76537, 12 pages.
The Int'l Preliminary Report on Patentability mailed Mar. 5, 2009 for related PCT patent application No. PCT/US07/76539, 8 pages.
The Int'l Search Report and Written Opinion, mailed Aug. 8, 2008, for related PCT patent application No. PCT/US07/76539, 12 pages.
The Int'l Search Report and Written Opinion, mailed Sep. 21, 2009, for related PCT patent application No. PCT/US09/53610, 11 pages.
Int'l Search Report and Written Opinion, mailed Dec. 17, 2010, for related PCT patent application No. PCT/US10/54423, 16 pages.

* cited by examiner

ADVERTISEMENT INSERTION DURING APPLICATION LAUNCH IN HANDHELD, MOBILE DISPLAY DEVICES

CROSS REFERENCE TO RELATED APPLICATIONS

This application is a continuation-in-part of U.S. patent application Ser. No. 11/828,204, entitled Micro-Splicer for Inserting Alternate Content to a Content Stream on a Handheld Device, filed Jul. 25, 2007, which in turn claims priority to U.S. provisional patent application Ser. No. 60/834,039, entitled Micro-Splicer in Mobile Device, filed Jul. 29, 2006, each of which is incorporated herein in its entirety by this reference thereto.

BACKGROUND OF THE INVENTION

1. Technical Field

The invention relates to insertion of content into multimedia streams. More specifically, the invention relates to the rendering of focused advertisements and alternate content for viewing by a target audience on a mobile handheld display device; and, more particularly, to the insertion of alternate content during a startup delay associated with application download and buffering, prior to program start, via wireless connection.

2. Description of the Background Art

The availability and growth of usage of handheld mobile display devices (MHDD), such as the personal digital assistant (PDA) and the cell phone, is revolutionizing digital multimedia content viewing ability and user experience. Alternate content, including advertisements to be viewed with any active content, is typically downloaded and stored in the MHDD for insertion into predefined advertisement spots (ad spots) during actual user viewing of content. The insertion of alternate content into an active content stream at a specified ad spot is effected by a micro-splicer instantiated on the MHDD. The content to be viewed is thus buffered on the MHDD before the user begins actual content viewing.

The MHDD is becoming a major contender for running normal application programs. Due to the lack of storage capability on the MHDD, typical application programs are downloaded onto the MHDD via a wireless connection at the time of use. The variable nature of the available bandwidth that connects the MHDD to the source or transmitter of the content/application necessitates the downloading and storing of programs in the local memory of the MHDD, and then running the content/application from the MHDD's local memory.

There is also a time delay associated with any application download. As noted above, the time it takes to download any program or content depends on the available bandwidth. This time is currently wasted time for the user, who has to wait idly for completion of program or content downloading.

It would be advantageous to provide a way for effectively using this wait time by providing content and/or alternate content from a targeted advertisement gateway to a user, where such content and/or alternate content is based on an advertising program, and on the characteristics of the user or a specific group of individuals.

It would be further advantageous if such a solution would allow for intelligent use of the available bandwidth of a multicast wireless broadcasting system to provide improved advertising campaign efficiency.

SUMMARY OF THE INVENTION

A time delay occurs when an application is launched in any mobile handheld display device (MHDD), while the application or content is being downloaded, and before the MHDD is ready for the user to interact with it. This time delay wastes the user's time, and is better used if targeted advertisements that are already stored on the MHDD can be rendered and displayed to the user on the screen while the user waits for completion of downloading of the application or content to the MHDD. An embodiment of the invention provides a micro-splicer that inserts alternate content for display on an MHDD, and renders and displays pre-stored advertisements during application launch time.

DETAILED DESCRIPTION OF THE INVENTION

Figure 1:
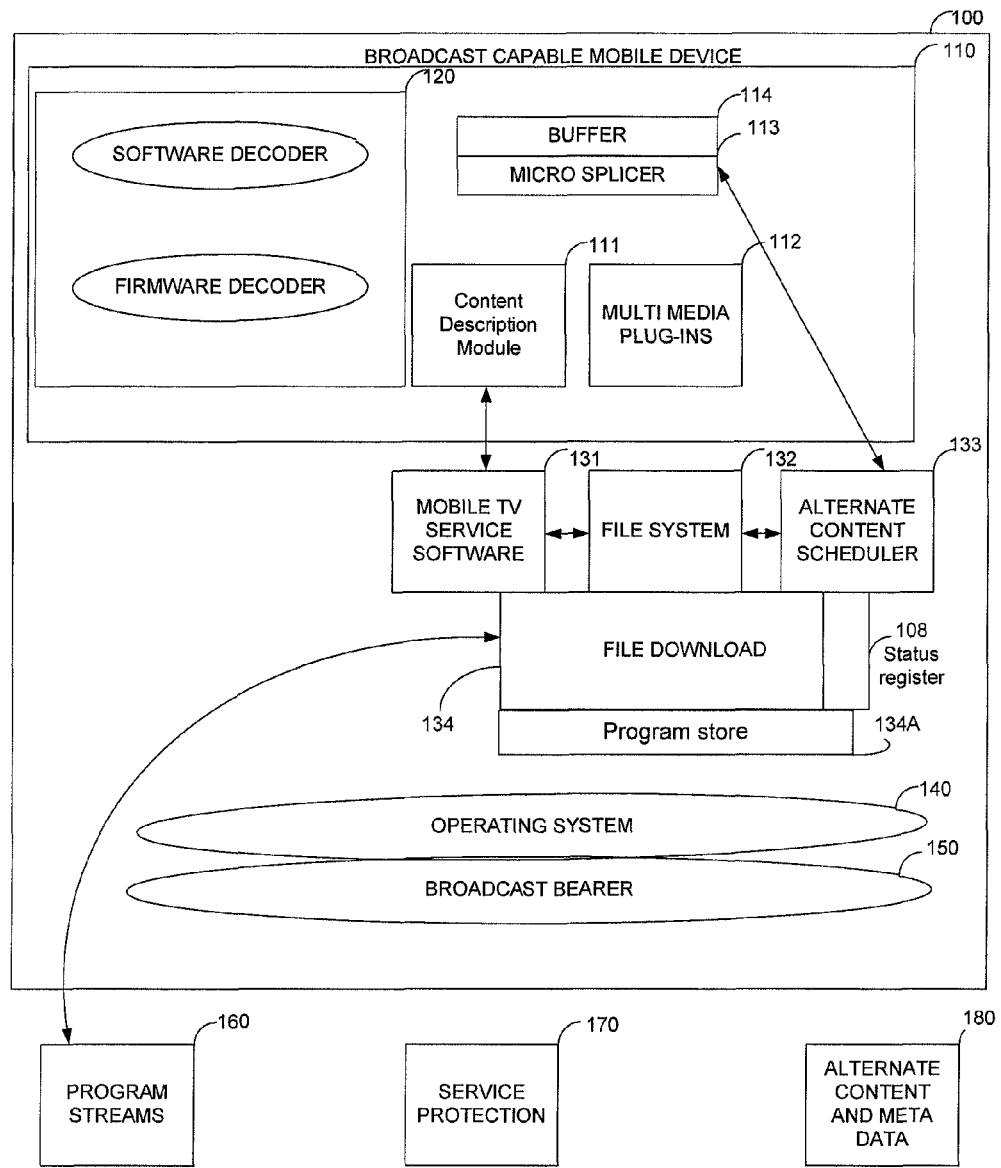
FIG. 1 is a block diagram showing entities involved in rendering and display of alternate content during available advertisement spots according to the invention.

A time delay occurs when an application is launched in any mobile handheld display device (MHDD), while the application or content is being downloaded, and before the MHDD is ready for the user to interact with it. The MHDD requires a specific amount of data to be available to provide quality viewing by the user on rendering and displaying on said MHDD. Typically there is a time delay for this amount of data to be received over the wireless connection. This time delay wastes the user's time, and is better used if targeted advertisements that are already stored on the MHDD can be rendered and displayed to the user on the screen while the user waits for completion of downloading of the application or content to the MHDD. An embodiment of the invention provides a micro-splicer that inserts alternate content for display on an MHDD, and renders and displays pre-stored advertisements during application launch time.

An embodiment of the invention makes good use of the time that it takes to download an application program and/or content into the MHDD, which time is otherwise wasted, by inserting, rendering, and displaying to a user of the MHDD gateway content or focused advertisements that are pre-stored on the MHDD as alternate content. The MHDD having built in capability for communication, downloading, processing, storage and display of multimedia content. As part of this capability a micro-splicer is previously instantiated on the MHDD and provides for insertion of the alternate content into a content stream, thus enabling alternate content insertion into the MHDD's display buffer during program downloading. On completion of program downloading, when the application is ready for operation by the user, and after display of the alternate content is completed, the application is launched from the MHDD's program storage. The alternate content is intended for a target audience and can comprise targeted advertisements or alternate content that was previously downloaded and stored on the MHDD, prior to the initiation of the program download. The micro-splicer inserts the chosen alternate content or advertisements into the MHDD's display buffer and displays same to the user while the user is waiting for the application to launch.

More specifically, an embodiment of the invention provides a method and apparatus that inserts alternate digital content for rendering and display on MHDDs during application download. In one embodiment, the micro-splicer is used for rendering and display of digital content on the MHDD during program downloading time. Such digital content can include, for example, advertisements, preference-based content, banners, public announcements, emergency notifications, etc. A sensor component continuously looks for the end-of-file indication or availability of sufficient data for quality display for start of an application program that is being downloaded, and provides this data regarding the end-of-file or sufficiency of data for rendering indication to the micro-splicer. The micro-splicer uses the program downloading time between the start of download, initiated by the user, and the end of the download, as shown by the end-of-file indication or data sufficiency indication in the down loaded program storage location, to render and display alternate content to a user of the MHDD from a local alternate content buffer memory. In one embodiment, the micro-splicer uses the otherwise wasted time during program download and launch on the MHDD, based upon meta-data previously supplied to the micro-splicer.

FIG. 1 is a block diagram showing the entities that participate in a micro-splicing operation in accordance with the U.S. patent application Ser. No. 11/828,204, entitled Micro-splicer for Inserting Alternate Content to a Content Stream on a Handheld device, and filed on 25 Jul. 2007, which application is incorporated herein in its entirety by this reference thereto. FIG. 1, however, is not limited to the previously known microsplicing operation and also shows a microsplicing operation in accordance with the invention herein, as discussed below. In FIG. 1, the main entity blocks of the micro-splicing architecture of a MHDD 100 comprise the alternate content scheduler (scheduler) 133 and the micro-splicer 113. The alternate content scheduler 133 receives alternate content and related metadata 180 over a broadcast or a unicast channel. The alternate content scheduler 133 helps to synchronize content switching on the MHDD by notifying the micro-splicer 113 of program download initiation and download status, as obtained from the status register 108 and the file download data store 134, 134A. The alternate content scheduler 133 also prepares appropriate locally-stored file content for decoding and pre-buffering pursuant to rendering such content on the MHDD.

The micro-splicer 113 acts as a thin pipe in the mobile media player 110 architecture. When a program is initiated, it can either be streamed to the MHDD from the Internet or launched from a program store in the MHDD. If, in the current example, the program streams 160 are received over the air, then the program is decrypted in the content description module 111 and fed into a local program buffer 134A, instead of to the content buffer 114, for display. During this process, the micro-splicer 113 provides alternate content from the alternate content store 180 to the content buffer 114 for display on the MHDD. When the program file download is complete, the program is transferred from the file download register 134 to the program store 134A. On receipt of file download completion and transfer status for the program file from the status register 108, the micro-splicer 113 stops any additional alternate content flow to the display buffer. On completion of the current alternate content insertion, the micro-splicer instructs the mobile media player 110 to check on the program implementation and to start rendering the program file from the program store 134A, as needed, to the display buffer 114. The micro-splicer 113, in tandem with the alternate content scheduler 133, makes the downloaded program stream active and displays the downloaded content, once the display of the alternate content is complete. Plug-ins are either previously installed in, or downloaded to, the media player and enabled as necessary.

When a mobile TV service is enabled for the MHDD, program streams flow via a broadcast channel into the MHDD. A mobile TV service library on the MHDD conveys the IP address and port of the device by which content is rendered to the MHDD. The micro-splicer 113 conveys program-stream metadata information to the alternate content scheduler library for channel or program specific alternate content insertion.

Figure 2:
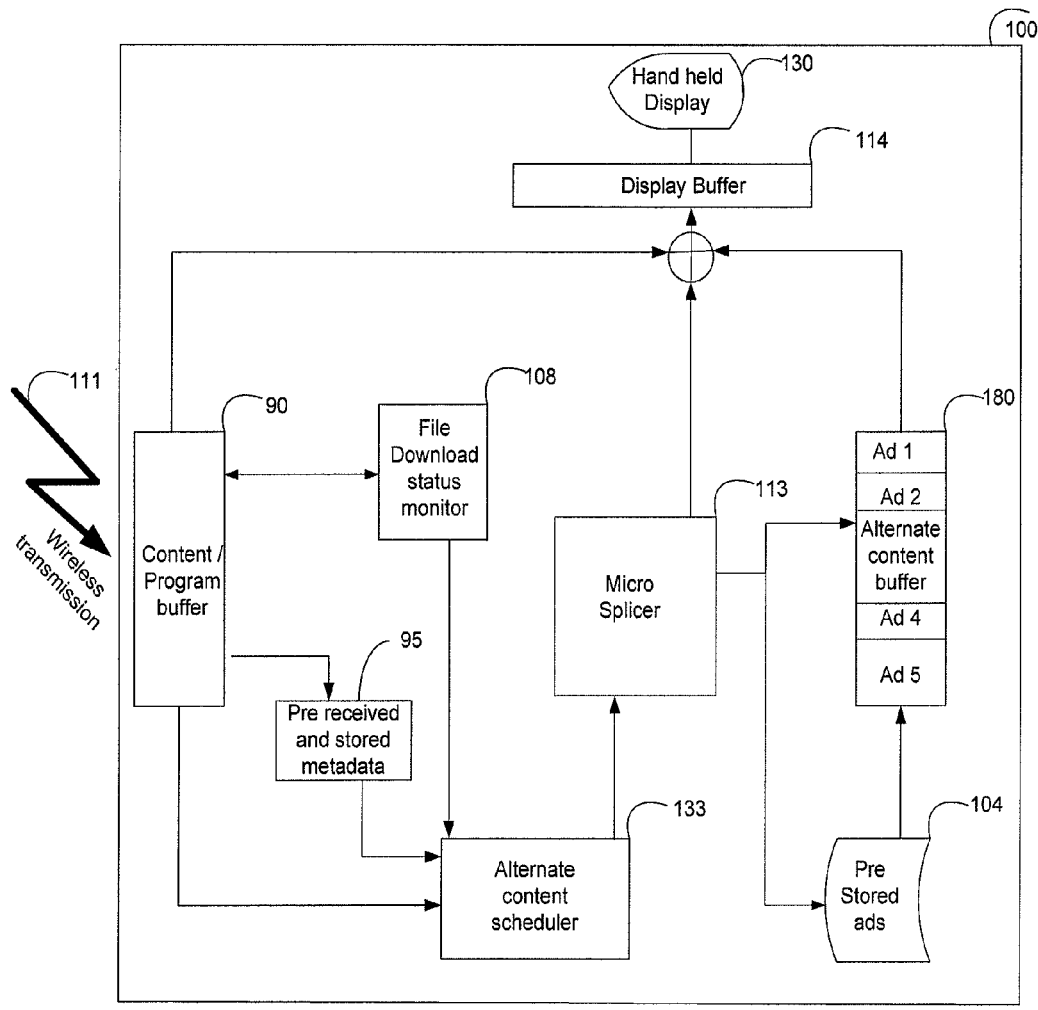
FIG. 2 is flow diagram showing operation of a micro-splicer for alternate content during the download of an application program to an MHDD according to the invention.

FIG. 2 is a flow diagram showing a micro-splicing architecture for alternate content insertion during initial program downloading time according to an embodiment of the invention. The alternate content scheduler 133 contains information regarding the program that is currently downloading to the MHDD. The alternate content scheduler fetches previously received, decoded, and stored metadata 95 concerning alternate content, such as pre-stored ads 104, that is to be inserted during program downloading. The metadata on the alternate content that is to be displayed is defined by currently running advertisement campaigns, and is delivered to the MHDD for storage on the MHDD. The alternate content can be, for example, programs, messages, or content from entities (sponsored media), such as advertisements to be rendered in the available time period during program download and for initiation as per an advertisement campaign policy.

Figure 3:
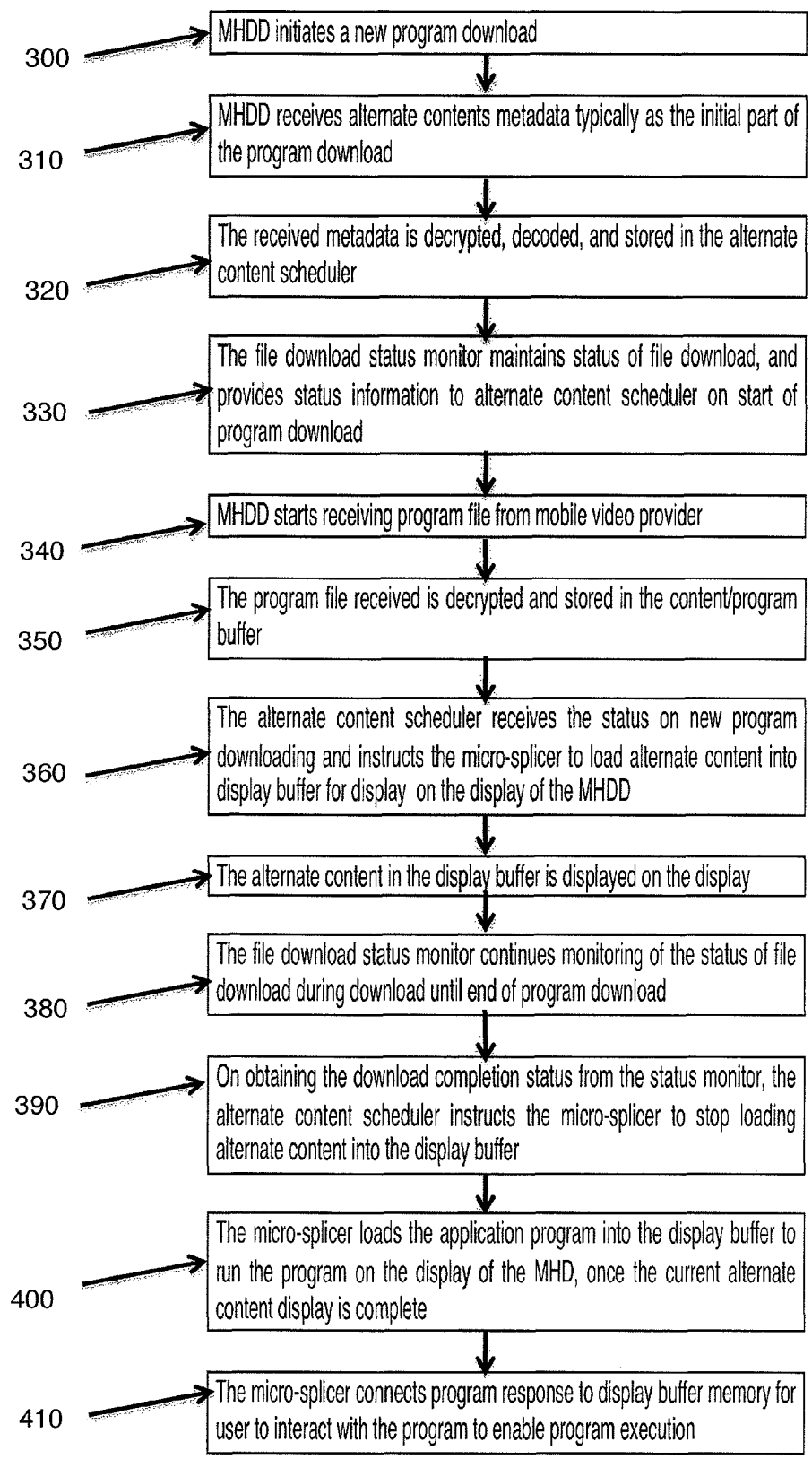
FIG. 3 is a flow diagram showing operation of the insertion and display of alternate content during program download according to the invention.

The operation of the insertion and display of alternate content, using the apparatus as shown in FIG. 1, during program download is shown in FIG. 3 and is as follows:

The MHDD initiates a new program download (300).

The MHDD receives alternate content metadata, typically as the initial part of the program download (310).

The received metadata is decrypted, decoded, and stored in the alternate content scheduler 133 (320).

The file download status monitor 108 maintains status of the file download, and provides status information to the alternate content scheduler at the start of the program download (330).

The MHDD starts receiving a program file from the mobile video provider (340).

The program file received is decrypted and stored in the content/program buffer 90 (350).

The alternate content scheduler 133 receives the status on downloading of the new program and instructs the micro-splicer 113 to load the alternate content into the display buffer 114 of the MHDD for display on the display 130 of the MHDD (360).

The alternate content in the display buffer 114 is displayed on the display 130 (370).

The file download status monitor 108 continues monitoring of the status of the file download during the download process until the end of the program download (380).

The alternate content scheduler 133 instructs the micro-splicer 113 to stop loading alternate content into the display buffer (390) when it receives the download completion status from the status monitor.

Once the current alternate content display is complete, the micro-splicer 113 loads the application program into the display buffer 144 to run the program, and to display the program on the MHDD display 130 (400).

The micro-splicer 113 connects the program to the display buffer memory to allow the user to interact with the program, thus enabling program execution (410).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method of synchronized insertion of alternate multimedia content into a mobile handheld display device (MHDD) for display to a user of said MHDD, said MHDD enabled with processing capability for communication, storage, computation and display, comprising the steps of:

said MHDD downloading over a wireless network link alternate multimedia content and storing said alternate multimedia content in an alternate content buffer in said MHDD prior to downloading a program over said wireless network link to said MHDD;

receiving metadata over said wireless network link at said MHDD prior to downloading said program, said metadata comprising information on which particular alternate multimedia content of said downloaded alternate multimedia content to display on said MHDD during said downloading of said program;

said MHDD decrypting, decoding, and saving said metadata on said MHDD in an alternate content scheduler;

said MHDD initiating said downloading of said program to said MHDD;

responsive to said initiating said downloading, said MHDD receiving program streams of said program over said wireless network link;

responsive to said MHDD receiving said program streams, said MHDD decrypting, decoding, and storing said program streams on said MHDD in a program store till data in said program store is sufficient for rendering and display on said MHDD;

responsive to said initiating said downloading, a program download status register informing said alternate content scheduler of said initiating said downloading said program, wherein said program download status register monitors a start of said a program downloading on said MHDD;

responsive to said informing said alternate content scheduler, said alternate content scheduler selecting a particular alternate multimedia content of said downloaded alternate multimedia content and associated with said program, said selecting based on said metadata;

responsive to said selecting said particular alternate multimedia content, said alternate content scheduler loading an MHDD display buffer with said stored particular alternate multimedia content;

rendering and displaying said particular alternate multimedia content on said MHDD with a micro-splicer in response to instructions received by said micro-splicer from said alternate content scheduler;

subsequent to said initiating said downloading, said program download status register continuing to monitor said program store and detecting when said stored program streams on said program store are sufficient to render and display on said MHDD;

responsive to detecting that said stored program streams on said program store are sufficient to render and display, said program download status register informing said alternate content scheduler of said detection;

responsive to receiving said informing by said program download status register, said alternate content scheduler stopping said loading said particular alternate multimedia content into said MHDD display buffer;

subsequent to said stopping loading said particular alternate multimedia content into said MHDD display buffer, loading said stored program streams into said MHDD display buffer from said program store based on instructions from said scheduler; and rendering and displaying said program streams on said MHDD from said MHDD display buffer with said micro-splicer;

such that said particular alternate multimedia content is inserted in a synchronized fashion into said MHDD and displayed during downloading of said program on said MHDD.

2. The method of claim 1, said micro-splicer performing the step of:

initiating rendering and starting display of program content only after completion of rendering and display of a currently rendered and displayed alternate multimedia content.

3. A method to insert and display alternate content in a mobile handheld digital device (MHDD), said MHDD enabled with onboard processing capability for communication, storage, computation and display, in addition to program execution, comprising the steps of:

said MHDD initiating a program download over a wireless network;

said MHDD receiving alternate content metadata;

decrypting and decoding said received metadata, using the onboard processing power of the MHDD, and storing said decrypted and decoded metadata in an alternate content buffer linked to a scheduler;

responsive to said initiating said program download and while said program is being downloaded by said MHDD, a file download status monitor maintaining status information of said program download and providing said status information to said scheduler from a start of said program download;

wherein said program download comprises the steps of:
said MHDD receiving a program file from a mobile video provider over said wireless network; and
decrypting said program file and storing said decrypted program file in a content/program buffer;

responsive to said scheduler receiving said status information of said program download, said scheduler, based on said alternate content metadata, instructing a micro-splicer to load alternate content into a display buffer of the MHDD for display on a display of the MHDD;

displaying said alternate content in said display buffer on said MHDD display;

while said alternate content is displayed on said MHDD display, said file download status monitor continuing to maintain status information of said program download until detecting an end of said program download or detecting sufficient data in said content/program buffer;

said scheduler instructing said micro-splicer to stop loading said alternate content into said display buffer when it receives a download completion status from said file download status monitor;

once said alternate content display is complete, said micro-splicer loading said program into said display buffer and displaying said program on said MHDD display.

* * * * *